United States Patent
Yamamoto et al.

(10) Patent No.: US 10,671,875 B2
(45) Date of Patent: Jun. 2, 2020

(54) MAIN-SUBJECT DETECTION METHOD, MAIN-SUBJECT DETECTION APPARATUS, AND NON-TRANSITORY COMPUTER READABLE STORAGE MEDIUM

(71) Applicant: CANON KABUSHIKI KAISHA, Tokyo (JP)

(72) Inventors: Takahisa Yamamoto, Kawasaki (JP); Masao Yamanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/359,665

(22) Filed: Mar. 20, 2019

(65) Prior Publication Data
US 2019/0220683 A1 Jul. 18, 2019

Related U.S. Application Data

(63) Continuation of application No. 15/091,083, filed on Apr. 5, 2016.

(30) Foreign Application Priority Data

Apr. 9, 2015 (JP) .................. 2015-080450

(51) Int. Cl.
*G06K 9/00* (2006.01)
*G06K 9/32* (2006.01)
*G06K 9/46* (2006.01)
*H04N 5/232* (2006.01)

(52) U.S. Cl.
CPC ......... *G06K 9/3241* (2013.01); *G06K 9/4604* (2013.01); *G06K 9/4671* (2013.01); *H04N 5/232* (2013.01)

(58) Field of Classification Search
None
See application file for complete search history.

(56) References Cited

U.S. PATENT DOCUMENTS

| 2003/0156757 A1* | 8/2003 | Murakawa | G06K 9/4609 382/195 |
| 2013/0129221 A1* | 5/2013 | Nakao | G06K 9/62 382/190 |
| 2015/0049910 A1* | 2/2015 | Ptucha | G06F 16/51 382/103 |

* cited by examiner

*Primary Examiner* — Wei Wen Yang
(74) *Attorney, Agent, or Firm* — Canon U.S.A., Inc. IP Division

(57) ABSTRACT

A degree-of-saliency map generated from an input image is divided into a plurality of partial areas, and the degree of nonuniformity is calculated from the distribution characteristics of the degrees of saliency of the partial areas. Whether a main subject is present in the input image is judged based on the calculated degree of nonuniformity.

8 Claims, 9 Drawing Sheets

MAIN-SUBJECT DETECTION METHOD, MAIN-SUBJECT DETECTION APPARATUS, AND NON-TRANSITORY COMPUTER READABLE STORAGE MEDIUM

This application is a Continuation of U.S. application Ser. No. 15/091,083, filed Apr. 5, 2016, which claims priority from Japanese Patent Application No. 2015-080450, filed Apr. 9, 2015. These applications are hereby incorporated by reference herein in their entireties.

BACKGROUND

Field

Aspects of the present invention generally relate to a technology of distinguishing whether a main subject is present in an input image.

Description of the Related Art

Various methods for detecting a main-subject area in an input image are known. Japanese Patent Laid-Open No. 2000-207564 discloses a method for determining a main-subject area based on the location or the size of a candidate object in an input image or based on semantic information indicating what a candidate area of a candidate object represents.

If such a main-subject area detection process is performed, for example, in an image capturing apparatus such as a digital camera, an autofocus (AF) adjustment and automatic tracking can be performed on a main subject.

Some input images, however, do not have a particular subject serving as a main subject. Examples of such images include an image (scenic image) of a distant view that includes the horizon, a skyline, or the like and that particularly does not have an attention-drawing object. Examples also include an image (uniform image) filled with a uniform texture such as an image filled with a wall or a stone wall. Such images do not have a particular main subject in many cases.

A method for detecting a main subject disclosed in Japanese Patent Laid-Open No. 2000-207564 detects at least one area as a main-subject area even in such an image having no particular main subject. This causes the AF, the automatic tracking, and other functions to be performed on an area that does not correspond to a main subject and causes a user to experience a feeling of uncertainty.

SUMMARY OF THE INVENTION

An aspect of the present invention provides extracting feature amounts from pixels based on at least one region of an input image and generating a map in which the extracted feature amounts respectively correspond to the pixels, dividing the generated map into a plurality of partial areas and extracting, on a per partial area basis, distribution characteristics each based on at least a corresponding one of the feature amounts, calculating a degree of nonuniformity of the extracted distribution characteristics of the feature amounts, the degree of nonuniformity being a degree of spatial nonuniformity, and judging, based on the calculated degree of nonuniformity, whether a main subject is present in the at least one region of the input image.

Further features of aspects of the present invention will become apparent from the following description of exemplary embodiments with reference to the attached drawings.

DESCRIPTION OF THE EMBODIMENTS

First Embodiment

Figure 1:
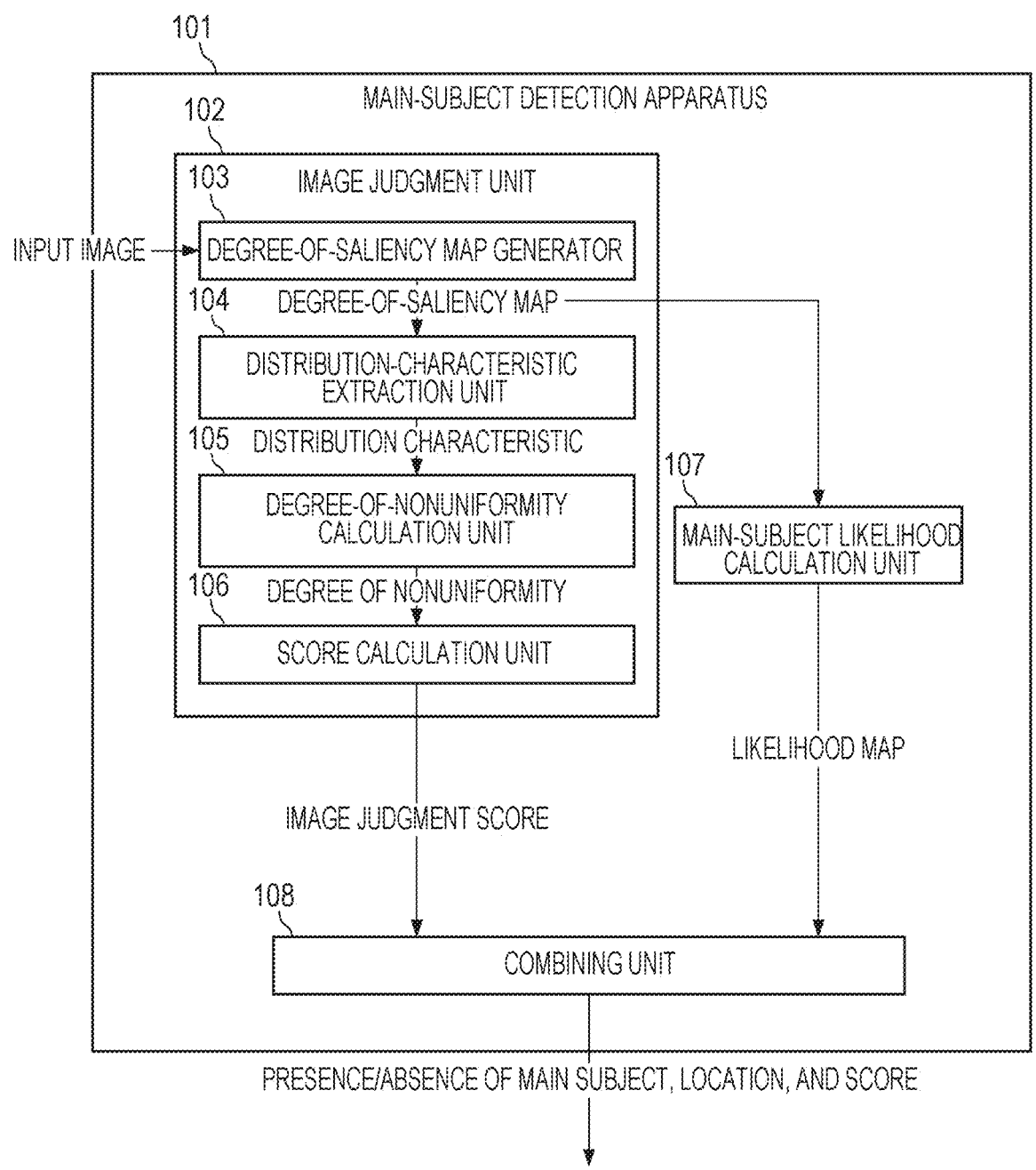
FIG. 1 is a schematic block diagram illustrating the configuration of a subject detection apparatus according to a first embodiment.

Hereinafter, embodiments of the present invention will be described in detail with reference to the drawings. FIG. 1 is a schematic block diagram illustrating the configuration of a main-subject detection apparatus 101 according to a first embodiment. The main-subject detection apparatus 101 includes an image judgment unit 102, a main-subject likelihood calculation unit 107, and a combining unit 108. The image judgment unit 102 includes a degree-of-saliency map generator 103, a distribution-characteristic extraction unit 104, a degree-of-nonuniformity calculation unit 105, and a score calculation unit 106.

The main-subject detection apparatus 101 according to the embodiment is implemented by using a semiconductor integrated circuit (LSI). The main-subject detection apparatus 101 may also include hardware such as a central processing unit (CPU), a read-only memory (ROM), a random-access memory (RAM), a hard disk drive (HDD), and other components. In this case, the CPU runs programs stored in the ROM, a hard disk (HD), and other components, and processes are thereby executed by, for example, components in the functional configuration and in a flowchart (described later). The RAM has a storage area functioning as a work area where the CPU loads and runs any of the programs. The ROM has a storage area for storing the programs and the like run by the CPU. The HD has a storage area for storing various programs needed for the CPU to execute processes and various pieces of data including data regarding a threshold and the like.

Hereinafter, the functional units of the main-subject detection apparatus 101 will be described. The image judgment unit 102 judges whether an input image includes a main subject. Since some input images (hereinafter, also referred to as absent-main-subject images) do not have a subject serving as a main subject, the image judgment unit 102 judges whether an input image is such an absent-mainsubject image. Examples of the absent-main-subject image include the scenic image and the uniform image that are described above. The images do not have a subject serving as a main subject in many cases. Simply performing a detection of a main-subject area on such an image often leads to a misdetection in which a specific area is erroneously detected as a main subject.

The image judgment unit 102 according to the embodiment checks distribution of salient areas in an input image to distinguish whether a main subject is present in the input image. For example, a uniform image has almost uniform texture patterns. Even if salient areas attributable to the texture patterns are present, it is expected that the salient areas are uniformly distributed in the entire image. In a scenic image, a horizon or skyline area is likely to be detected as a salient area, it is expected that such salient areas are distributed uniformly in a horizontal direction. The image judgment unit 102 extracts distribution characteristics of salient areas that are specific to such an absent-main-subject image and thereby judges whether a main-subject area is present in an input image. Hereinafter, a process performed by the image judgment unit 102 according to the embodiment will be described in detail.

Figure 2:
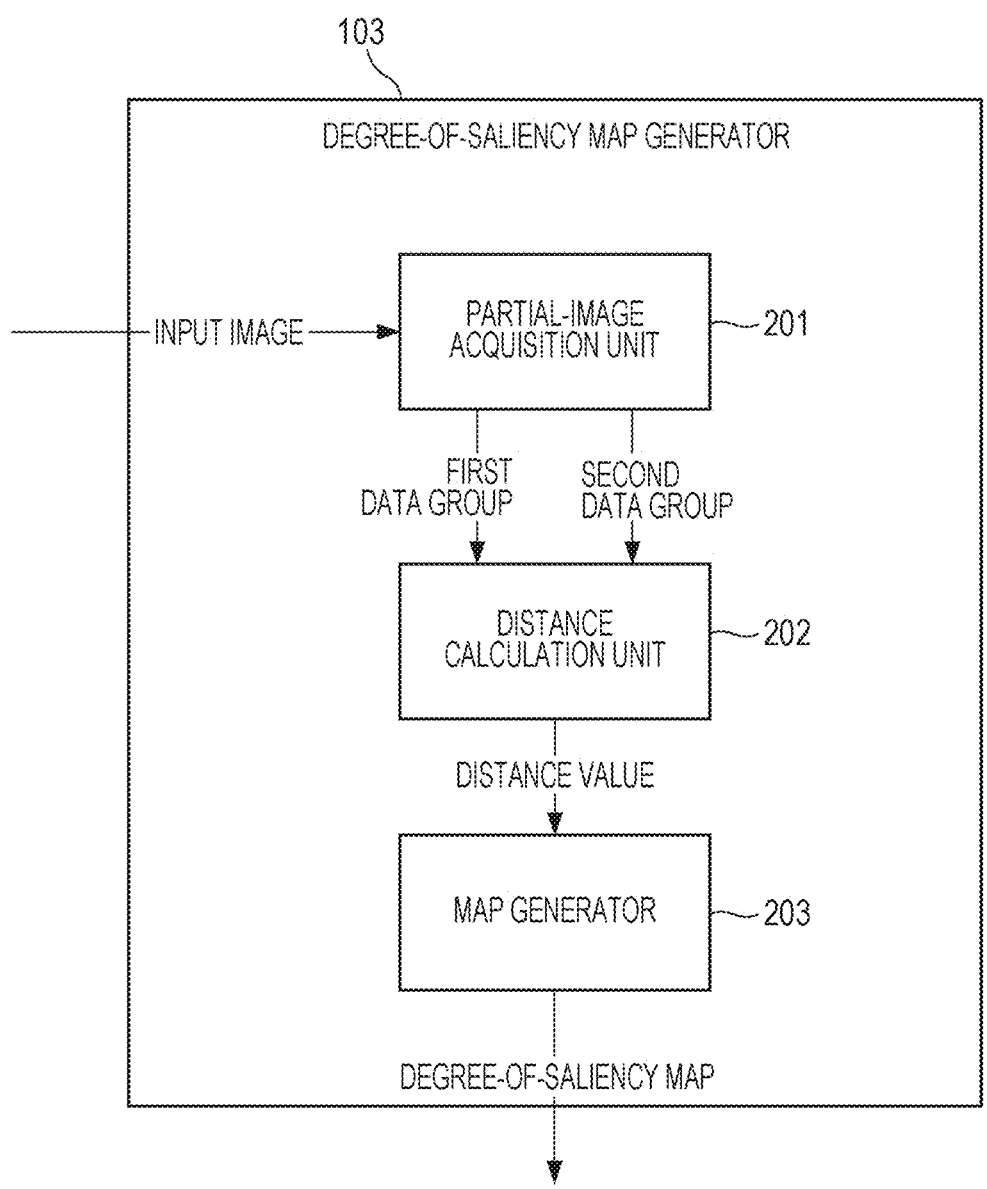
FIG. 2 is a schematic block diagram illustrating the configuration of a map generator according to the first embodiment.

The degree-of-saliency map generator 103 acquires an input image to be processed and generates a map of the degrees of saliency (degree-of-saliency map) of the input image. FIG. 2 is a schematic block diagram illustrating in detail the configuration of the degree-of-saliency map generator 103. In FIG. 2, a partial-image acquisition unit 201 scans the input image using a scan window, cuts out an area image at each extraction location from the input image, and acquires the cut-out area image as a partial image. Data regarding the acquired partial image is output to a distance calculation unit 202.

Figure 3:
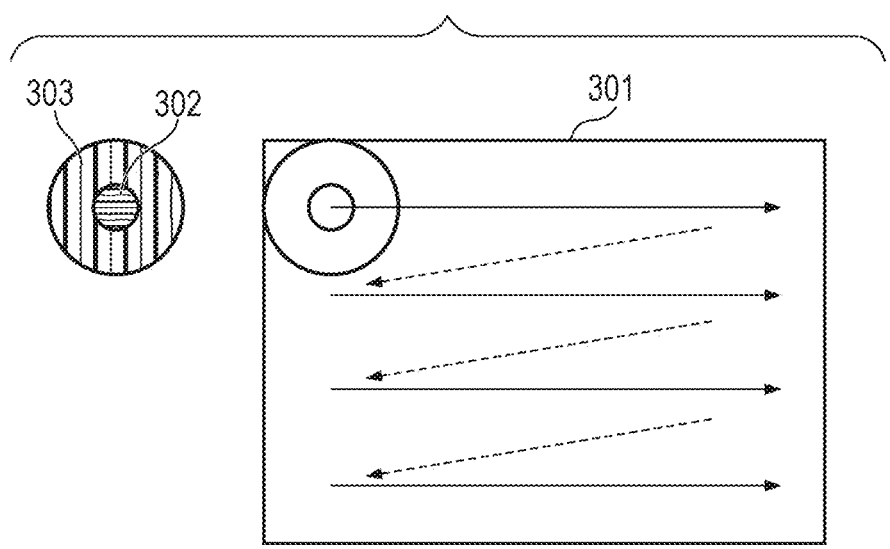
FIG. 3 is a diagram for explaining a process performed by a partial-image acquisition unit according to the first embodiment.

FIG. 3 is a diagram for explaining a process performed by the partial-image acquisition unit 201. In FIG. 3, reference numeral 301 denotes an input image, reference numeral 302 denotes a first region (inner circular region) of the scan window, and reference numeral 303 denotes a second region (outer annular region) of the scan window. As illustrated in FIG. 3, the partial-image acquisition unit 201 performs an input image scan process on pixel arrays in the input image by using the scan window and acquires, as a partial image, an area corresponding to the scan window at each pixel location. In the embodiment, pieces of image data of a cut out area corresponding to the first region 302 are referred to as a first data group, and pieces of image data of a cut out area corresponding to the second region 303 are referred to as a second data group. In the embodiment in this manner, scanning is performed on the input image by using the scan window, the partial area is cut out at each pixel location in the input image, and the two data groups that are the first and second data groups are output to the distance calculation unit 202. Examples of the groups of data regarding the acquired partial image include low-order feature amounts (such as a luminance value, an edge intensity value, and a texture value) and a combination thereof.

The first region 302 and the second region 303 are respectively defined by the two circular regions (the inner circular region and the outer annular region) in the description above, but the embodiment is not limited thereto. For example, two rectangular regions (an inner rectangular region and an outer contour region) or regions of another shape may define the first region 302 and the second region 303. The first region 302 and the second region 303 may also be located in such a manner as to have the centers of the regions (the centers of gravity) at different locations. As long as first and second regions are set as different regions, any of various shapes may be used for the first and second regions.

Referring back to FIG. 2, the distance calculation unit 202 calculates a distance between the two data groups that have been input. Since the partial-image acquisition unit 201 outputs the data groups acquired for each pixel in the input image every time the data groups are acquired, the distance calculation unit 202 calculates a distance (distance value) between the data groups every time the data groups are input. To calculate the distances each between the data groups, any of the various publicly known methods are usable. For example, such a method that uses histograms respectively generated for the two input data groups may be used. In the method, an absolute difference between the histograms is obtained for each bin, and the sum of the absolute differences is calculated. Information regarding each distance value between the data groups that is a calculation result is output to a map generator 203.

The map generator 203 generates a degree-of-saliency map by using the distance value calculated by the distance calculation unit 202. Since the distance calculation unit 202 calculates the distance value corresponding to the pixel location in the input image, the map generator 203 allocates the distance value to the corresponding location in the degree-of-saliency map. In the embodiment, the distance value is regarded as the degree of saliency, and data taking the form of an image (degree-of-saliency map) is generated.

Figure 8:
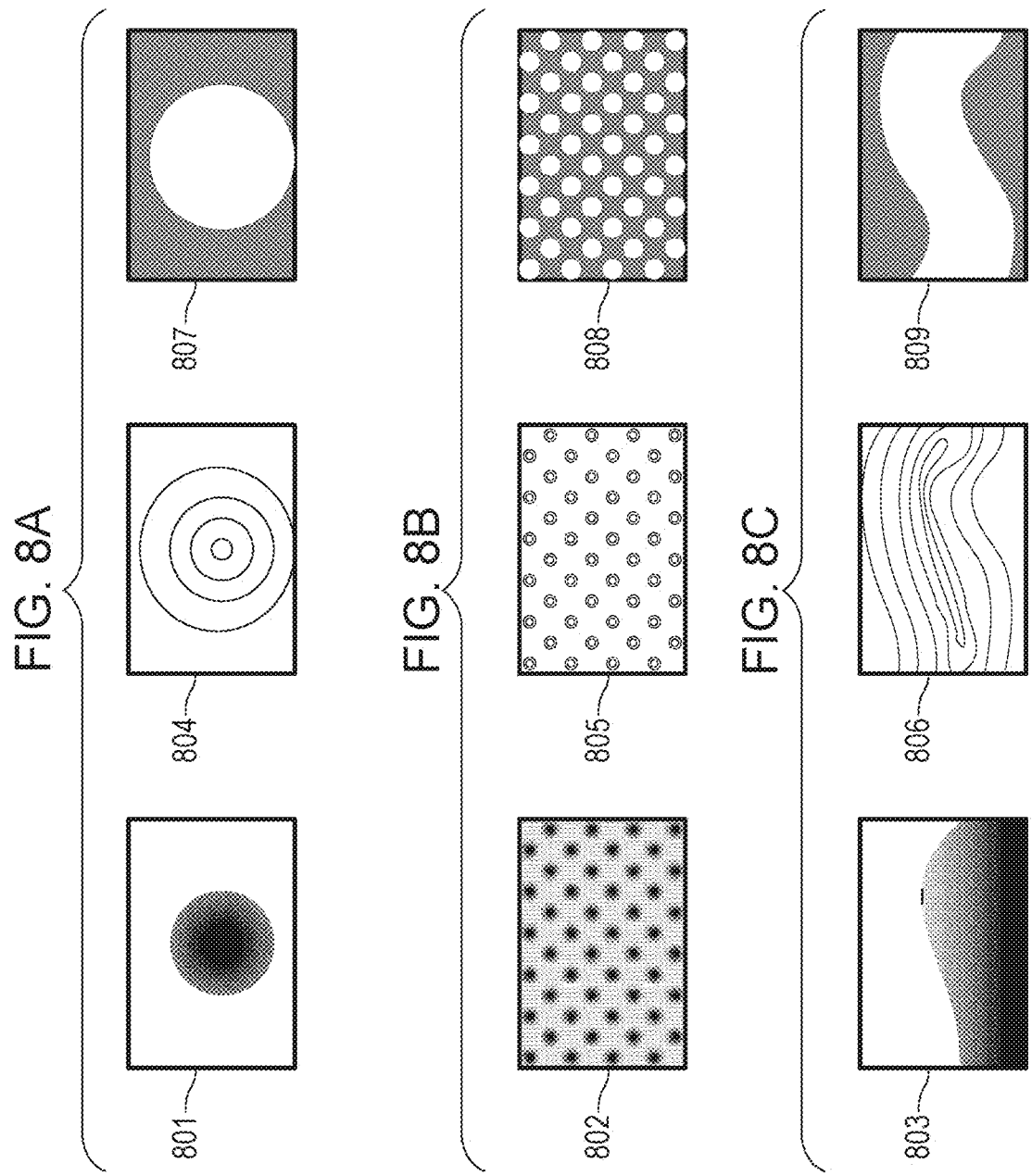
FIGS. 8A, 8B, and 8C are diagrams schematically illustrating degree-of-saliency maps generated in the first embodiment.

FIGS. 8A, 8B, and 8C are diagrams schematically illustrating degree-of-saliency maps generated by the map generator 203 of the embodiment and binary images generated as a result of a binarization process (described later) performed on the degree-of-saliency maps. FIG. 8A illustrates an example in which a degree-of-saliency map is generated from an image having a circular object serving as a main subject. FIGS. 8B and 8C illustrate examples in which degree-of-saliency maps are respectively generated from a uniform image and a scenic image that are absent-main-subject images. In FIGS. 8A to 8C, reference numerals 801, 802, and 803 denote input images in the respective examples, and reference numerals 804, 805, and 806 denote degree-of-saliency maps in the respective examples. The image having a main subject in FIG. 8A results in the degree-of-saliency map 804 in which contour lines define salient areas and the central salient area exhibits a high degree of saliency. The uniform image in FIG. 8B results in the degree-of-saliency map 805 in which a region exhibiting a high degree of saliency periodically appears in accordance with a periodic texture of the input image 802. In the scenic image in FIG. 8C, the input image 803 has a skyline portion that is salient and the color and luminance of which are different from those near the skyline portion. Accordingly, the degree-of-saliency map 806 has contour lines that follow the skyline. Binary images 807, 808, and 809 will be described later. A process related to the degree-of-saliency maps generated by the degree-of-saliency map generator 103 has heretofore been described.

Referring back to FIG. 1, the distribution-characteristic extraction unit 104 extracts a characteristic indicating the distribution of the degrees of saliency in the input image by using the degree-of-saliency map generated by the degree-of-saliency map generator 103. To extract the distribution characteristic, how pixels exhibiting a high degree of saliency are distributed may be checked. In the embodiment, the distribution characteristic of pixels that exhibit a high degree of saliency and satisfy a predetermined condition is checked. Specifically, the degree of saliency of each pixel is compared with a threshold calculated based on the degree-of-saliency map. Pixels exhibiting a degree of saliency higher than the threshold are regarded as pixels satisfying the predetermined condition, and the distribution characteristic of such pixels is extracted. In another example, pixels exhibiting the degrees of saliency that are ranked in a top predetermined percent in the degree-of-saliency map may be handled as pixels exhibiting a high degree of saliency and satisfying the predetermined condition.

In the following description, pixels exhibiting a degree of saliency equal to or higher than the threshold are referred to as white pixels (corresponding to pixels taking on a value of "1" in binarization based on the threshold), and pixels exhibiting a degree of saliency lower than the threshold are referred to as black pixels (corresponding to a pixel taking on a value of "0" in the binarization). The distribution-characteristic extraction unit 104 of the embodiment checks the distribution characteristic of the white pixels. When checking how the pixels exhibiting the high degree of saliency are distributed, the distribution-characteristic extraction unit 104 of the embodiment divides the degree-of-saliency map into partial areas and extracts the distribution characteristic of the pixels exhibiting the high degree of saliency for each partial area. The distribution-characteristic extraction unit 104 herein checks the distribution characteristic of the white pixels but may check the distribution characteristic of the black pixels.

Figure 4:
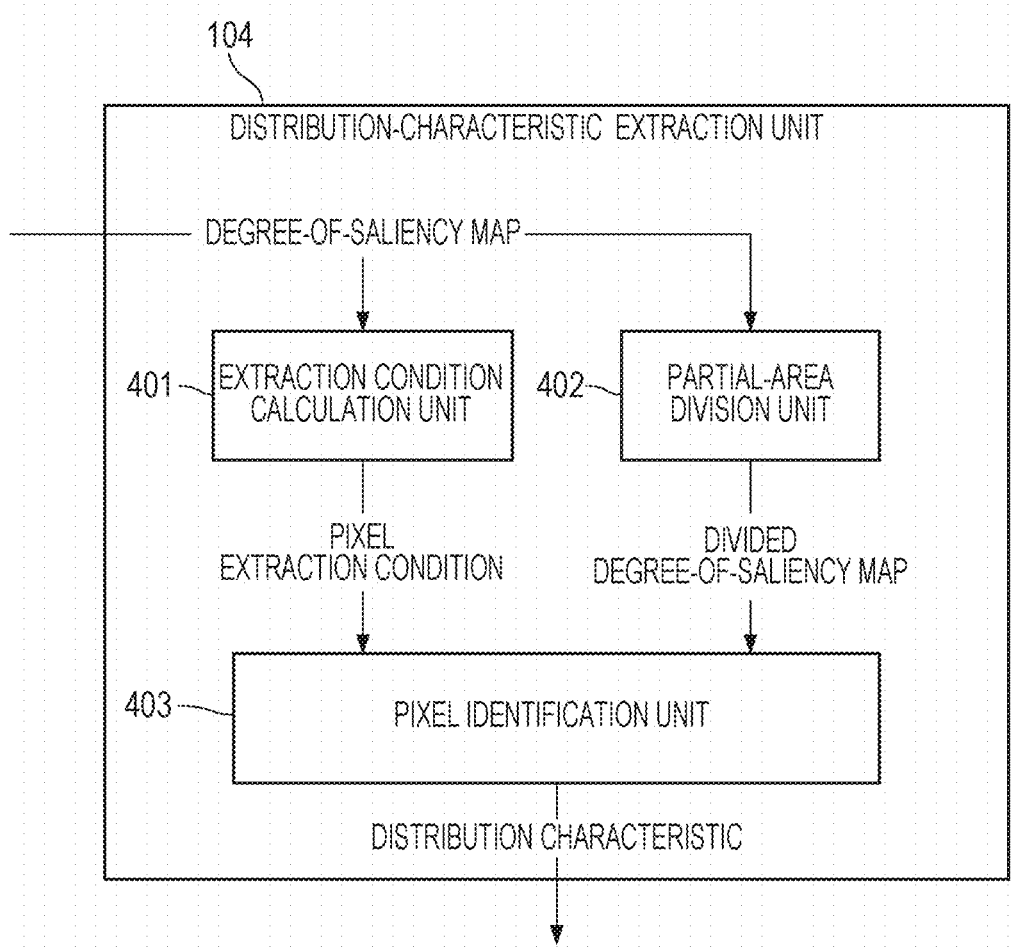
FIG. 4 is a schematic block diagram illustrating the configuration of a distribution-characteristic extraction unit according to the first embodiment.

The details of a process performed by the distribution-characteristic extraction unit 104 will be described by using the schematic diagram of the blocks of the distribution-characteristic extraction unit 104 in FIG. 4. In FIG. 4, an extraction condition calculation unit 401 calculates the threshold by performing statistical processing on the degree-of-saliency map, and outputs the threshold as a pixel extraction condition to a pixel identification unit 403. In the statistical processing for calculating the threshold in the embodiment, a value ranked at a predetermined percentile point of values of the degree of saliency in the degree-of-saliency map is set as the threshold. Accordingly, when the threshold thus calculated is used for the binarization of the degree-of-saliency map, the white pixels account for a percent equal to the top predetermined percent.

A partial-area division unit 402 divides the received degree-of-saliency map into partial areas. The image judgment unit 102 judges whether distribution characteristics extracted for the respective partial areas obtained as a result of division performed by the partial-area division unit 402 are similar to or different from each other and performs an image judgment in which whether a main subject is likely to be present. Accordingly, the partial-area division unit 402 desirably divides the input image into areas appropriately to fulfill the purpose of the judgment. A method for dividing an input image into partial areas in the embodiment will be specifically described later. The partial-area division unit 402 outputs the divided degree-of-saliency map to the pixel identification unit 403.

The pixel identification unit 403 identifies, for each partial area, pixels (white pixels) satisfying the predetermined condition by using the pixel extraction condition (threshold) and the degree-of-saliency map, the pixel extraction condition (threshold) being calculated by the extraction condition calculation unit 401, the degree-of-saliency map having partial areas as the result of the division performed by the partial-area division unit 402. The pixel identification unit 403 subsequently extracts the distribution characteristic of the pixels. In the embodiment, the pixel identification unit 403 calculates, as the distribution characteristic, the percentage of the number of white pixels per partial area. The distribution characteristic (percentage of the number of white pixels per partial area) thus calculated is output to the degree-of-nonuniformity calculation unit 105.

Referring back to FIG. 1, the degree-of-nonuniformity calculation unit 105 calculates, as the degree of nonuniformity of the degrees of saliency in the input image, the degree of spatial nonuniformity of the distribution characteristics extracted by the distribution-characteristic extraction unit 104 for the respective partial areas. The spatial nonuniformity herein means how far the distribution characteristics extracted for the respective partial areas are different from each other. Specifically, the partial areas having different distribution characteristics have a high degree of nonuniformity, while the partial areas having the same distribution characteristic have a low degree of nonuniformity.

In the embodiment, the percentage of the number of white pixels is calculated as the distribution characteristic of each partial area. Examples of a method for calculating the degree of nonuniformity in this case include a method by which the standard deviation of the percentages of the number of white pixels is calculated. In the method, as a difference in white pixel percentage between the partial areas is decreased, the standard deviation is decreased, and the degree of nonuniformity is also decreased. Contrarily, as the difference in white pixel percentage between the partial areas is increased, the standard deviation is increased, and the degree of nonuniformity is also increased. The value used to calculate the degree of nonuniformity is not limited to the standard deviation. Another statistical value indicating that the partial areas have different distribution characteristics or have the same distribution characteristics may also be used for the calculation.

A relationship between how the degree-of-saliency map is divided into partial areas and the degree of nonuniformity will be described with reference to the degree-of-saliency maps and the binary images schematically illustrated in FIGS. 8A to 8C. The embodiment is provided to distinguish between a "present-main-subject image" in FIG. 8A and an absent-main-subject image such as the uniform image and the scenic image in FIGS. 8B and 8C. The degrees of saliency calculated for these images are illustrated in the degree-of-saliency maps 804, 805, and 806. In other words, an image having a main subject is expected to produce the degree-of-saliency map 804 in which areas exhibiting a high degree of saliency are distributed locally in a main-subject area. In contrast, the uniform image that is an absent-main-subject image is expected to produce the degree-of-saliency map 805 in which the salient areas attributable to the texture are uniformly distributed over the image. The scenic image that is an absent-main-subject image is expected to produce the degree-of-saliency map 806 in which the salient areas are distributed in the horizontal direction because a horizon or skyline area tends to be detected as a salient area. In other words, the salient areas in the absent-main-subject image tend to be uniformly distributed, while the salient areas in the present-main-subject image tend to be distributed locally and nonuniformly.

In FIGS. 8A to 8C, the images 807 to 809 are binary images schematically illustrating results of binarization performed on the degree-of-saliency maps 804 to 806 by using thresholds, respectively. The embodiment is provided to enable distinction of a present-main-subject image based on the binary image 807 and an absent-main-subject image based on the binary images 808 and 809. More specifically, in the embodiment, a degree-of-saliency map is divided into a plurality of partial areas, the degree of nonuniformity is calculated based on the percentage of the white pixels (the distribution characteristic of the degrees of saliency) in each partial area, and whether a main subject is present in the input image is thereby judged based on the degree of nonuniformity. At this time, how the degree-of-saliency map is divided influences the calculated degree of nonuniformity and is thus important.

Figure 9:
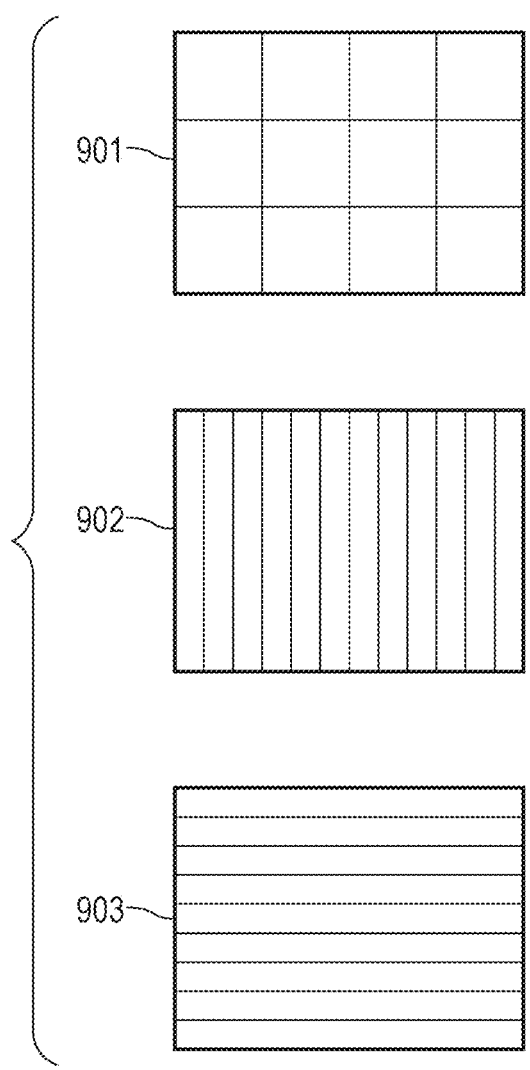
FIG. 9 is a diagram for explaining patterns of dividing the degree-of-saliency map in the first embodiment.

A relationship between the degree-of-saliency map division method and the spatial nonuniformity of the degree of saliency calculable using the degree-of-saliency map division method will be described with reference to FIG. 9. FIG. 9 illustrates examples of division patterns used for dividing a degree-of-saliency map into a plurality of partial areas. FIG. 9 illustrates a pattern 901 for dividing a degree-of-saliency map into partial areas lengthways and widthways, a pattern 902 for dividing a degree-of-saliency map into partial areas lengthways, and a pattern 903 for dividing a degree-of-saliency map into partial areas widthways. For example, when a degree-of-saliency map is divided into partial areas lengthways and widthways as in the pattern 901, two-dimensional nonuniformity of the degrees of saliency in the input image can be calculated. When a degree-of-saliency map is divided into partial areas lengthways as in the pattern 902, one-dimensional horizontal nonuniformity of the degrees of saliency in the input image can be calculated. When a degree-of-saliency map is divided into partial areas widthways as in the pattern 903, one-dimensional vertical nonuniformity of the degrees of saliency in the input image can be calculated.

Consider cases where each of the binary images 807 to 809 of the respective degree-of-saliency maps in FIGS. 8A to 8C is divided as in the patterns 901 to 903 in FIG. 9. For example, if the binary images 807 to 809 are divided as in the pattern 901, the binary images 807 and 809 exhibit the white pixel percentages that largely differ between the partial areas and exhibit a high nonuniformity. In contrast, the binary image 808 exhibits the white pixel percentages that are approximately the same between the partial areas and exhibits a low nonuniformity. Table below lists nonuniformity degree relationships between the binary image type and the division pattern.

extracts the distribution characteristic (white pixel percentage) for each partial area. The degree-of-nonuniformity calculation unit 105 calculates as the standard deviation of the percentages of the white pixels as the degree of nonuniformity of the distribution characteristic of the degrees of saliency of each partial area thus set.

Referring back to FIG. 1, the score calculation unit 106 calculates an image judgment score based on the degree of nonuniformity calculated by the degree-of-nonuniformity calculation unit 105. The image judgment score indicates the likelihood of the input image being an absent-main-subject image. Accordingly, it can be said that the score calculation unit 106 functions as a generator that generates the information indicating how much the input image is likely to be an absent-main-subject image. Any type of score may be used as an image judgment score, as long as a high degree of nonuniformity of the degree of saliency produces a low image judgment score. For example, the reciprocal number of the degree of nonuniformity is usable as the image judgment score.

In addition, an existing machine learning method may be used as a method for calculating an image judgment score from the degree of nonuniformity. Specifically, if a general class separation method is used for a large number of absent-main-subject and present-main-subject images, whether the input image is an absent-main-subject image or a present-main-subject image can be distinguished based on a specific degree of nonuniformity. When this method is used, for example, a binary value of 1 as the image judgment score may be output in accordance with distinction as an absent-main-subject image, and a binary value of 0 in accordance with distinction may be output as a present-main-subject image. In addition, since the likelihood is calculated before classification into classes in many general class separation methods, the likelihood may be output as the image judgment score. When the likelihood is used, the image judgment score takes on a continuous value.

The main-subject likelihood calculation unit 107 calculates main-subject likelihood at each pixel location (or in each area) of the image based on the input degree-of-saliency map. The main-subject likelihood represents the

TABLE

| | 901 | 902 | 903 |
| --- | --- | --- | --- |
| 807 (Present-main-subject image) | Nonuniformity: High | Nonuniformity: High | Nonuniformity: High |
| 808 (Uniform image) | Nonuniformity: Low | Nonuniformity: Low | Nonuniformity: Low |
| 809 (Scenic image) | Nonuniformity: High | Nonuniformity: Low | Nonuniformity: High |

The embodiment is provided to judge that a uniform image and a scenic image are absent-main-subject images, and area segmentation as in the pattern 902 is thus usable to discriminate between an absent-main-subject image and a present-main-subject image based on the degree of nonuniformity because the salient areas in each of the uniform image and the scenic image are uniformly distributed in the horizontal direction.

In the embodiment as described above, the degree-of-saliency map is divided into the partial areas lengthways (with partial areas arranged in a direction corresponding to the horizontal direction of the image) by using the pattern 902. The distribution characteristic of the salient areas specific to the absent-main-subject image is thereby detected, and the image can be judged. In the embodiment, the distribution-characteristic extraction unit 104 divides the degree-of-saliency map into the partial areas lengthways and likelihood of the presence of a main subject at each pixel location (or in each area). The likelihood is herein calculated based on a rule of thumb in which a main subject is present in the center of the image and is a salient area in many cases. In the embodiment, the likelihood at each pixel location is calculated based on the degree of saliency at the pixel location and a distance between the pixel location and the center of the image. The main-subject likelihood may be set to be decreased as the distance from the center of the image is increased. In the embodiment, a value obtained by dividing the degree of saliency at each pixel location by a distance between the pixel location and the center of the image is used as the main-subject likelihood. The main-subject likelihood applicable to the embodiment is not limited thereto and may be a value calculated by another method.

The main-subject likelihood calculation unit 107 calculates the main-subject likelihood at each pixel location (or in each area) in this manner. The main-subject likelihood calculation unit 107 subsequently outputs, as a likelihood map, the main-subject likelihood calculated at each pixel location (or in each area) to the combining unit 108.

The combining unit 108 combines the image judgment score calculated by the score calculation unit 106 with the likelihood map calculated by the main-subject likelihood calculation unit 107 and outputs the final main-subject detection result. As described above, the image judgment score calculated by the score calculation unit 106 takes on a binary value or a continuous value.

In a case where a binary value is used as the image judgment score, the value indicates whether the current input image is an absent-main-subject image or a present-main-subject image. Accordingly, if the image judgment score is "1" and thus indicates an absent-main-subject image, the combining unit 108 judges the input image as an absent-main-subject image and outputs information indicating the content to that effect as a main-subject detection result. If the image judgment score is "0" and thus indicates a present-main-subject image, a main-subject detection result may be output based on the likelihood map. Since the main subject is considered to be present at the location where a high likelihood is exhibited, a score of the likelihood at the location is output.

In a case where such a continuous value that is increased when the input image is an absent-main-subject image is used as the image judgment score, a main-subject detection result may be output based on a map (referred to as the final map) obtained by dividing the likelihood map by the image judgment score. In this case, if the image judgment score is high (if it is judged that the input image is likely to be an absent-main-subject image), the final map has low values as a whole. If the image judgment score is low (if it is judged that the input image is likely to be a present-main-subject image), the final map has high values as a whole. The final map subsequently undergoes predetermined threshold-based processing. If there is no area exhibiting a map value exceeding a threshold, the input image can be judged to be an absent-main-subject image. If there is an area exhibiting a map value exceeding a threshold, the area can be judged to be a main-subject area.

Information regarding the main-subject area detected in this manner or information indicating the absent-main-subject image is output to an apparatus that performs processing on the main-subject area. For example, in an image capturing apparatus such as a digital camera, the information regarding the detected main-subject area is used for an AF process and an automatic tracking process. In a case where the input image is an absent-main-subject image, a main-subject detection apparatus outputs information indicating the content to that effect. This reduces the forced execution of the AF automatic tracking process on an area that causes the user to experience a feeling of uncertainty. Note that a semiconductor integrated circuit provided in an image capturing apparatus such as a digital camera may function as the main-subject detection apparatus. In this case, the image capturing apparatus itself corresponds to the main-subject detection apparatus of the embodiment.

Figure 5:
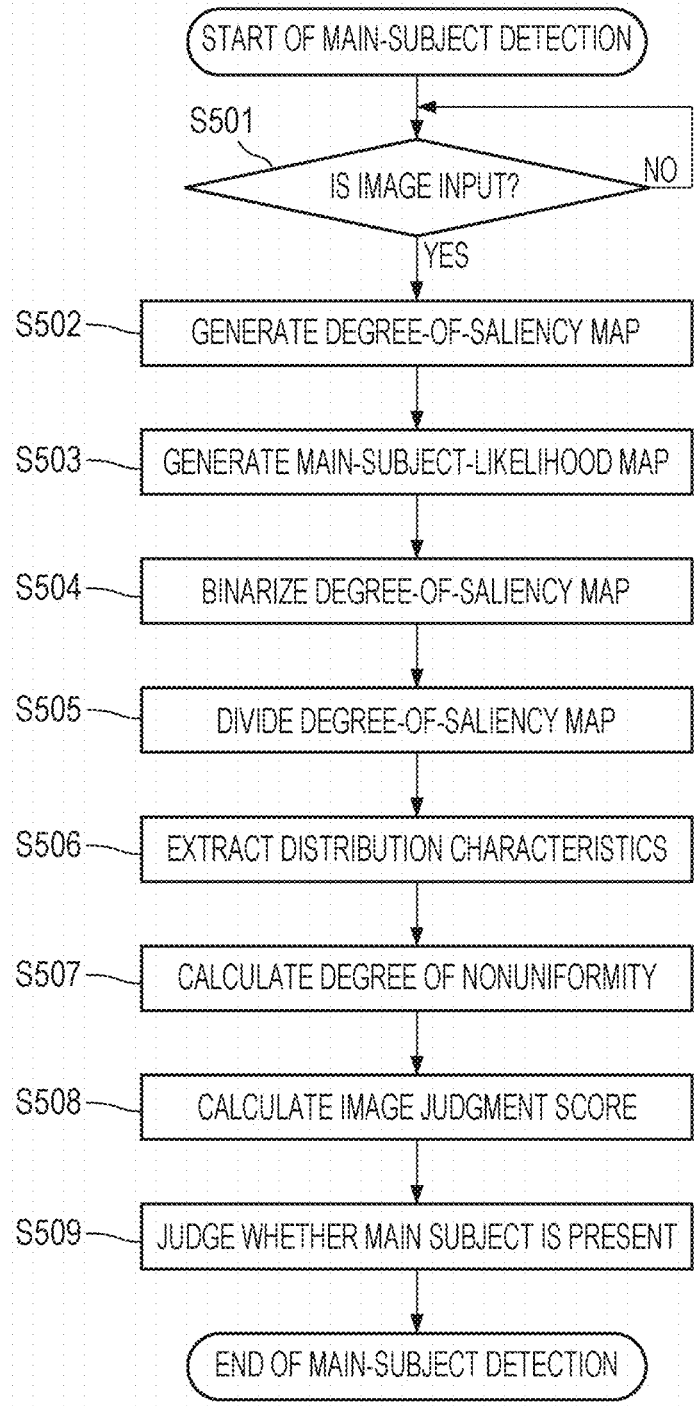
FIG. 5 is a flowchart of a main-subject detection method according to the first embodiment.

Subsequently, a process performed by the main-subject detection apparatus 101 in the main-subject detection method will be described. FIG. 5 is a flowchart illustrating the procedures of the main-subject detection method according to the first embodiment. In step S501, the image judgment unit 102 checks whether an input image is input in the main-subject detection apparatus 101. If input is confirmed, the process proceeds to step S502.

In step S502, the degree-of-saliency map generator 103 makes calculations and generates a degree-of-saliency map of the input image. In step S503, the main-subject likelihood calculation unit 107 calculates main-subject likelihood based on the degree-of-saliency map. In step S504, the distribution-characteristic extraction unit 104 subsequently binarizes the degree-of-saliency map generated in step S502. In the embodiment, the distribution-characteristic extraction unit 104 calculates a threshold from the degree-of-saliency map and binarizes the degree-of-saliency map by using the threshold as a reference.

In step S505, the distribution-characteristic extraction unit 104 divides the binarized degree-of-saliency map. In the embodiment as described above, the degree-of-saliency map is divided into a plurality of partial areas lengthways as in the pattern 902. In step S506, the distribution-characteristic extraction unit 104 calculates, for each partial area resulting from the division, the percentage of the number of white pixels as the distribution characteristic of each partial area.

In step S507, the degree-of-nonuniformity calculation unit 105 calculates the degree of nonuniformity from the percentages of the numbers of white pixels in the partial areas. The standard deviation of the percentages of the numbers of white pixels is used as the degree of nonuniformity. In step S508, the score calculation unit 106 calculates an image judgment score from the calculated degree of nonuniformity. The image judgment score indicates the likelihood of an input image being an absent-main-subject image. In the embodiment, the reciprocal number of the degree of nonuniformity is used as the image judgment score.

In step S509, the combining unit 108 calculates the final main-subject detection result. If it is judged that a main subject is present in the input image, the final main-subject detection result is output together with the location of the detected main subject and a score (the reliability of the main-subject detection result). If it is judged that a main subject is not present in the input image, information indicating the content to that effect is output.

In the embodiment as described above, the degree-of-saliency map generated from the input image is divided into the partial areas, and the degree of nonuniformity is calculated from the distribution characteristic of the degrees of saliency of each partial area. In the embodiment, whether the main subject is present in the input image can be distinguished based on the degree of nonuniformity.

Second Embodiment

A second embodiment of the invention will be described. The components described in the first embodiment are denoted by the same reference numerals, and description thereof is omitted.

In the second embodiment, the distribution characteristic extraction process performed by the distribution-characteristic extraction unit 104 and the degree of nonuniformity calculation process performed by the degree-of-nonuniformity calculation unit 105 are different from those in the first embodiment. Hereinafter, the differences from the first embodiment will be described.

First, as in the first embodiment, the extraction condition calculation unit 401 of the distribution-characteristic extraction unit 104 of the embodiment extracts target pixels (white pixels) based on the size relationship with the calculated threshold. In the embodiment, however, the median of the degree-of-saliency map is calculated and used as the threshold. The division process is executed by the partial-area division unit 402 in the same manner as in the first embodiment.

In the process executed by the pixel identification unit 403 in the first embodiment, the percentage of the number of extracted white pixels is calculated for each partial area and is used as the distribution characteristic of the degrees of saliency. In the second embodiment, an absolute value of a difference between the number of white pixels and the number of black pixels in each partial area is used as the distribution characteristic. The following is the reason why the process is executed in the embodiment.

Consider a case where the binarization is performed by using the median of the degree-of-saliency map as the threshold as in the embodiment and where the number of pixels having the same degree of saliency as the median is ignored. In this case, the white pixels and the black pixels have the same number of pixels. To make the distribution characteristic (the absolute value of a difference between the number of white pixels and the number of black pixels) equal in the partial areas in the case where the binary map is divided into a plurality of partial areas, the number of white pixels and the number of black pixels need to be equal to each other (or are distributed in percentages close to each other) in every partial area. In other words, if the number of white pixels and the number of black pixels are equal to each other (or are distributed in percentages close to each other) in every partial area, the spatial uniformity in distribution of the degrees of saliency is high. Contrarily, if the difference between the number of white pixels and the number of black pixels varies according to the partial areas of the binary map, that is, in such a case where white pixels dominate in a specific partial area and where black pixels dominate in another partial area, the nonuniformity is high.

Specifically, in a case where the absolute value of the difference between the number of white pixels and the number of black pixels is used as the distribution characteristic, a value close to zero of the distribution characteristic of a partial area indicates a high spatial uniformity in the distribution of the degrees of saliency, and a high value of the distribution characteristic of the partial area indicates a high spatial nonuniformity in the degrees of saliency. The distribution-characteristic extraction unit 104 binarizes the degree-of-saliency map in this manner by using the median of the degree-of-saliency map as the threshold and extracts, as the distribution characteristic, the absolute value of the difference between the number of white pixels and the number of black pixels that is calculated for each partial area. This enables the degree-of-nonuniformity calculation unit 105 to calculate the degree of the spatial nonuniformity (or uniformity) at the subsequent stage.

Subsequently, the degree-of-nonuniformity calculation unit 105 adds up the distribution characteristics (absolute values of the differences each between the number of white pixels and the number of black pixels) calculated for the respective partial areas. As described above, in the case of the spatial uniformity in the distribution of the degrees of saliency, the distribution characteristic of each partial area takes on a value close to zero, and the value of the sum is thus a low value that is close to zero. In the case of the spatial nonuniformity in the distribution of the degrees of saliency, the distribution characteristic of each partial area takes on a high value, and the value of the sum is thus a high value. Accordingly, the degree-of-nonuniformity calculation unit 105 adds up the absolute values of the differences each between the number of white pixels and the number of black pixels obtained for the respective partial areas and outputs the value of the sum as the degree of nonuniformity.

In computation in the embodiment as described above, the difference between the number of white pixels and the number of black pixels in each partial area is calculated, and the difference values are added up to obtain the degree of nonuniformity. This leads to a smaller amount of computation in the embodiment than in the first embodiment using the standard deviation of the percentages of the white pixels. In particular, in a case where the main-subject detection apparatus of the embodiment functions integrally with an image capturing apparatus such as a digital camera including the main-subject detection apparatus incorporated therein, the low load on the computation processing leads to reduction of a period of time of detection processing and power saving.

Third Embodiment

A third embodiment of the invention will be described. In the third embodiment, a plurality of degrees of nonuniformity are calculated. In this case, a division pattern used for dividing a degree-of-saliency map into partial areas is changed in accordance with the type of an application provided with a main-subject detection result, in other words, a plurality of division patterns are used to divide a degree-of-saliency map into partial areas. The components described in the first and second embodiments are denoted by the same reference numerals, and description thereof is omitted.

Examples of the application provided with a main-subject detection result include an application that adjusts AF on an area detected as a main-subject area and an application that performs the automatic tracking on the main-subject area. It is conceivable that a feature required for the main subject detection varies with the application. For example, in the automatic tracking process, the uniform image and the scenic image are expected to be judged as absent-main-subject images as described above based on the absence of an object to be tracked. In contrast in the AF process, only the uniform image is expected to be judged as the absent-main-subject image because the scenic image is not troubled by an automatically focused horizon or skyline. As described above, the useful image judgment criterion varies with the application type. In the embodiment, the pattern used for dividing a degree-of-saliency map into a plurality of partial areas is changed in accordance with the application provided with a main-subject detection result.

Figure 6:
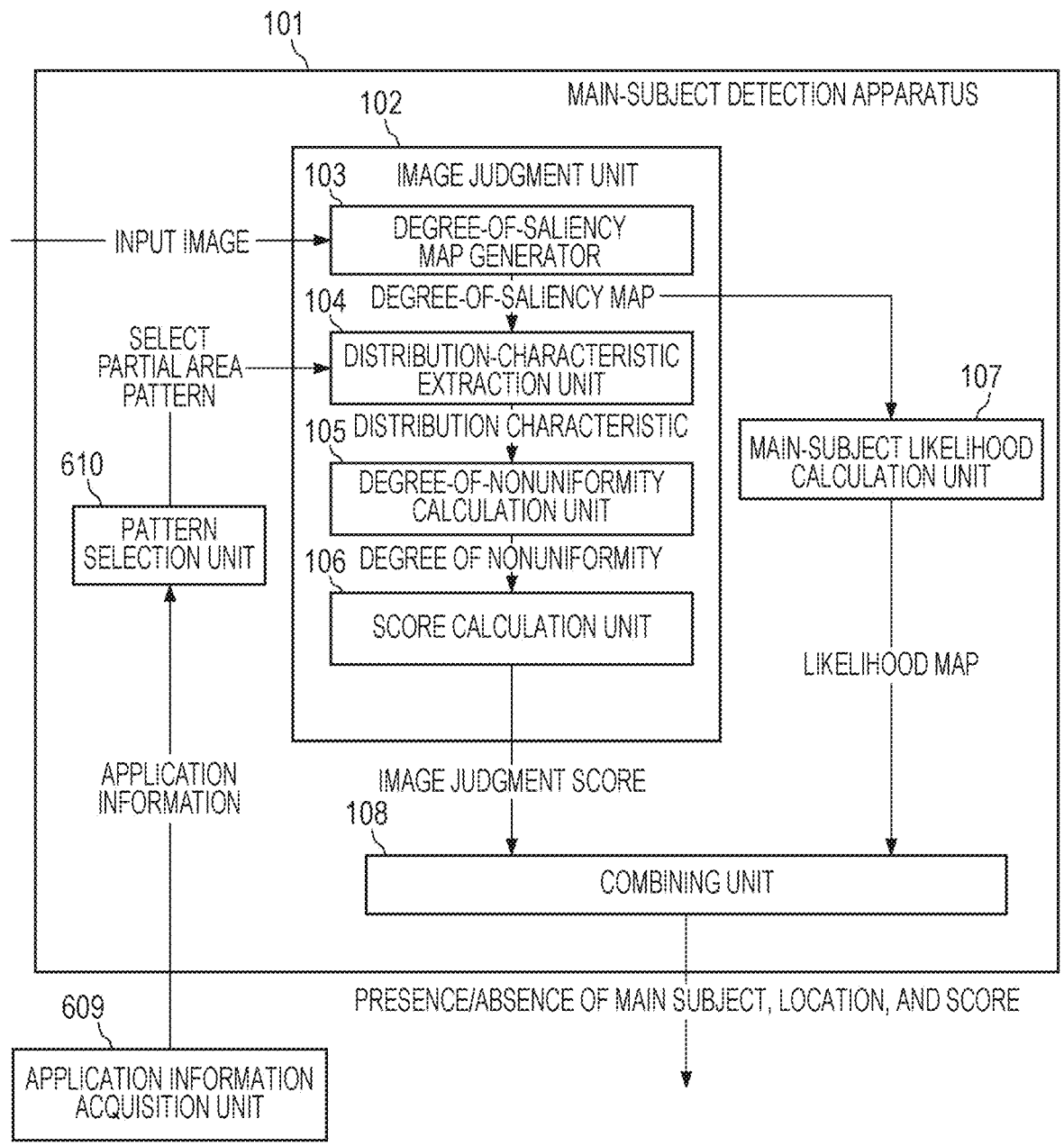
FIG. 6 is a schematic block diagram illustrating the configuration of a subject detection apparatus according to a third embodiment.

FIG. 6 is a schematic block diagram illustrating the configuration of a main-subject detection apparatus 101 according to the third embodiment. The components described in the first embodiment are denoted by the same reference numerals, and description thereof is omitted. Hereinafter, a difference from the first embodiment will be described.

The main-subject detection apparatus 101 of the embodiment includes an application information acquisition unit 609 and a pattern selection unit 610. The application information acquisition unit 609 acquires information regarding the type of an application provided with a main-subject detection result and outputs the acquired information to the pattern selection unit 610. Conceivable examples of the application provided with a main-subject detection result include an AF application, an auto exposure (AE) application, and an automatic tracking application. The application information acquisition unit 609 herein acquires, as the information regarding the application type, an image capturing mode set in a digital camera. For example, in a case where an AUTO mode is set as the image capturing mode, the application provided with a main-subject detection result is the AF application. In the automatic tracking mode, the automatic tracking process is provided with a main-subject detection result. Alternatively, a user may directly designate an application provided with a main-subject detection result. In this case, the user designation may be received, and information in the designation may be acquired as application information.

The pattern selection unit 610 selects one of partial area patterns associated with the application information acquired by the application information acquisition unit 609 and outputs the information as partial-area-pattern selection information to the distribution-characteristic extraction unit 104.

Application information is in advance associated with a corresponding one of the partial area patterns and information regarding the relationship there between is stored, for example, in a storage unit of the main-subject detection apparatus 101. Specifically, a partial area pattern suitable for an image to be judged as an absent-main-subject image has been determined in accordance with the type of the set application.

For example, an application requiring judgment of both of a uniform image and a scenic image as absent-main-subject images is the automatic tracking application, and an application requiring judgment of only a uniform image as an absent-main-subject image is the AF application. When the automatic tracking is set as the application information, the pattern 902 illustrated in FIG. 9 is selected as the partial area pattern. In a case where the degree-of-saliency map is divided into partial areas as in the pattern 902, the binary images of the respective uniform and scenic images each have a low degree of nonuniformity calculated therefrom. The use of the feature thus enables the score calculation unit 106 to judge that each of the uniform image and the scenic image is likely to be an absent-main-subject image.

Likewise, when the AF is set as the application information, the pattern 901 or the pattern 903 illustrated in FIG. 9 is selected as the partial area pattern. For example, the degree-of-saliency map is divided into partial areas as in the pattern 903, the binary image of only the uniform image has a low degree of nonuniformity calculated therefrom. The use of the feature thus enables the score calculation unit 106 to judge that only the uniform image is likely to be an absent-main-subject image.

The partial-area pattern information selected by the pattern selection unit 610 is output to the distribution-characteristic extraction unit 104. The distribution-characteristic extraction unit 104 divides the degree-of-saliency map into a plurality of partial areas in accordance with the partial-area pattern information and extracts the distribution characteristic of the degrees of saliency in the same manner as in the first embodiment.

As described above, the embodiment enables judgment of an absent-main-subject image performed in accordance with the type of the application provided with a main-subject detection result and thus enables highly flexible main subject detection.

Fourth Embodiment

To calculate the degrees of saliency in the description above, the histograms are respectively generated for the data groups obtained from the two respective regions, an absolute difference between the histograms is obtained for each bin, and the sum of the absolute differences is calculated. In the embodiment, however, the degree-of-saliency calculation method is not limited thereto.

The form of the scan window used for calculating the degrees of saliency is not limited to the form composed of the two regions of the first and second regions illustrated in FIG. 3. For example, a scan window composed of one region may be used.

Figure 7:
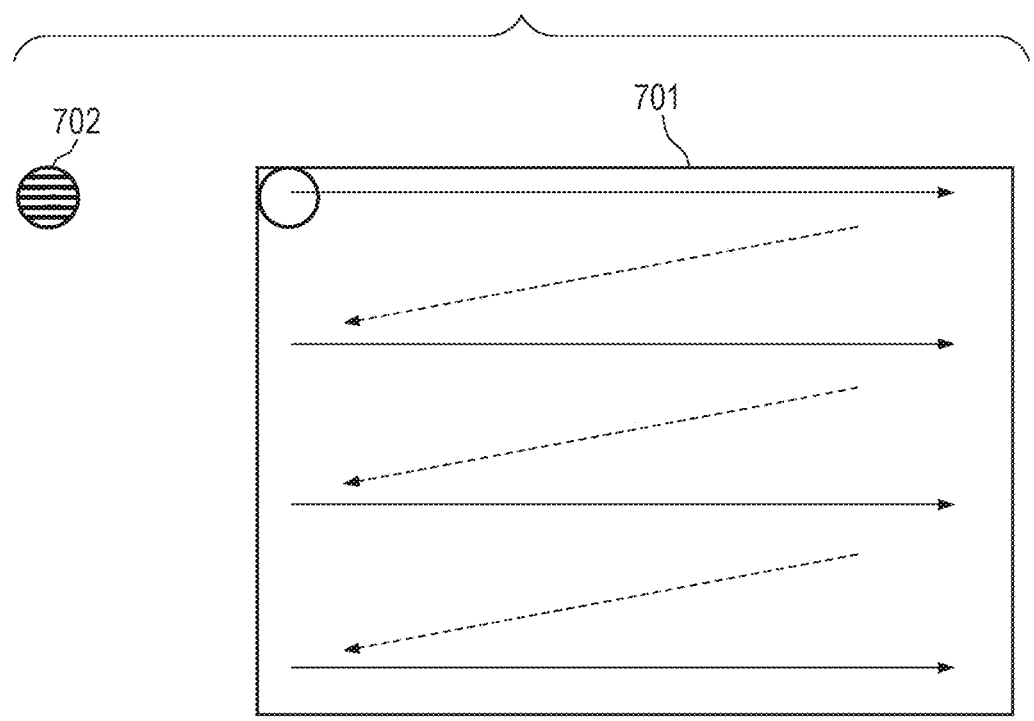
FIG. 7 is a diagram for explaining a process performed by a partial-image acquisition unit according to other embodiments.

FIG. 7 is a diagram for explaining another example of the process for acquiring partial images. In this case, an input image 701 is scanned a plurality of times by using the scan window composed of a region 702 that is a single region. An area corresponding to the region 702 in the input image 701 is cut out at each pixel location in the input image 701 to acquire a partial image, the region 702 corresponding to the first region. Pieces of data regarding the partial image are used as a first data group. The entire input image is set as a second region, and pieces of data regarding the entire input image are used as a second data group.

Each degree of saliency calculated by using the method illustrated in FIG. 3 is the degree of saliency calculated from a local point of view based on the first data group corresponding to the first region and the second data group corresponding to the second region neighboring the first region. In contrast, it can be said that the degree of saliency calculated by using the method in FIG. 7 is the degree of saliency calculated from a global point of view based on the difference between the first region and the entire image because the same second data group corresponding to the entire image is used for the calculations. This method reduces computation processing load because the data regarding the entire image is always used as the second data group for the calculations. Although the data regarding the entire image is herein used as the second data group, a specific region that is fixed in the input image may also be used as the second region.

In the description above, the nonuniformity of the distribution characteristics of the feature amounts is obtained for the entire input image, and whether the input image is a present-main-subject image or an absent-main-subject image is distinguished. The embodiment, however, is applicable to a configuration in which the nonuniformity of the distribution characteristics of the feature amounts is obtained for not the entire input image but a specific region of the input image to judge whether a main subject is present in the region.

In the description above, the distribution characteristics in the degree-of-saliency map generated from the input image are checked, but a feature amount other than the degree of saliency may be used to generate a map, and the distribution characteristics in the feature amount map may be checked. For example, the distribution characteristics in an edge image obtained by performing edge extraction may be checked. Since a main subject has an edge serving as an outline, it is expected that a certain number of high-intensity edges are extracted in a present-main-subject image. In contrast, since a scenic image has edges along the horizon or a skyline, it is expected that the spatially distributed edges are extracted. The embodiment uses such a feature and is thus applicable to a configuration for judging whether an input image is an absent-main-subject image. As described above, the embodiment is widely applicable to a configuration for generating a map in which a feature amount at each pixel location in an input image is associated with the pixel location.

With the configurations described above, aspects of the present invention enable judgement of whether a main subject is present in an input image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. An image processing method comprising:
   extracting feature amounts from a plurality of positions in an input image;
   deriving a distribution of the extracted feature amounts in the input image;
   determining, based on a characteristic of the distribution of the feature amounts, whether or not a main subject is present in the input image; and
   outputting information indicating absence of the main subject if it is determined that the main subject is not present anywhere in the input image.

2. The image processing method according to claim 1, wherein in the determining of whether the main subject is present, the determining is performed based on non-uniformity of the distribution of the feature amounts.

3. The image processing method according to claim 1, wherein in the outputting of the information indicating absence of the main subject, the information is output to an apparatus which performs a processing using an area of the main subject.

4. The image processing method according to claim 1, further comprising:
   deriving a position of the main subject based on the distribution of the feature amounts; and
   outputting a position of the main subject if the main subject is determined to be present in the input image.

5. The image processing method according to claim 1, wherein in the determining of whether the main subject is present, dividing the input image into a plurality of areas and the determining is performed based on a characteristic of a distribution of the feature amounts in respective areas.

6. The image processing method according to claim 1, wherein in the determining of whether the main subject is present, the determining is performed based on a characteristic of a distribution of the feature amounts satisfying a predetermined condition.

7. An image processing apparatus comprising:
   one or more processors; and
   a memory coupled to the one or more processors, the memory having stored thereon instructions which, when executed by the one or more processors, cause the apparatus to:
   extract feature amounts from a plurality of positions in an input image;
   derive a distribution of the extracted feature amounts in the input image;
   determine, based on a characteristic of the distribution of the feature amounts, whether or not a main subject is present in the input image; and
   output information indicating absence of the main subject if it is determined that the main subject is not present anywhere in the input image.

8. A non-transitory computer readable storage medium configured to store computer executable instructions for causing a computer to execute an object detection method, the object detection method comprising:
   extracting feature amounts from a plurality of positions in an input image;
   deriving a distribution of the extracted feature amounts in the input image;
   determining, based on a characteristic of the distribution of the feature amounts, whether or not a main subject is present in the input image; and
   outputting information indicating absence of the main subject if it is determined that the main subject is not present anywhere in the input image.

* * * * *